(12) United States Patent
Kim et al.

(10) Patent No.: US 8,651,516 B2
(45) Date of Patent: Feb. 18, 2014

(54) CURTAIN AIRBAG DEVICE

(75) Inventors: Minfun Kim, Yokohama (JP); Yoshihiro Ohba, Yokohama (JP); Hidenori Suzuki, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 21 days.

(21) Appl. No.: 13/498,027

(22) PCT Filed: Sep. 24, 2010

(86) PCT No.: PCT/JP2010/066583
§ 371 (c)(1),
(2), (4) Date: Mar. 23, 2012

(87) PCT Pub. No.: WO2011/037199
PCT Pub. Date: Mar. 31, 2011

(65) Prior Publication Data
US 2012/0267879 A1    Oct. 25, 2012

(30) Foreign Application Priority Data
Sep. 25, 2009   (JP) .................................. 2009-221687

(51) Int. Cl.
*B60R 21/16*    (2006.01)

(52) U.S. Cl.
USPC ........................................ 280/730.2; 280/739

(58) Field of Classification Search
USPC .............................................. 280/730.2, 739
See application file for complete search history.

(56) References Cited

U.S. PATENT DOCUMENTS 6,843,502 B2 *   1/2005   Aoki et al. ................. 280/730.2
8,096,574 B2 *   1/2012   Okimoto et al. ........... 280/728.2
8,286,991 B2 *  10/2012   Shimazaki et al. ........ 280/728.2
2007/0063490 A1  3/2007   Minamikawa

FOREIGN PATENT DOCUMENTS

| JP | 2006-168398 | 6/2006 |
|----|-------------|--------|
| JP | 2006-306312 | 11/2006 |
| JP | 2007-106403 | 4/2007 |
| JP | 2008-30717  | 2/2008 |
| JP | 2008-168781 | 7/2008 |
| JP | 2009-023439 | 2/2009 |

OTHER PUBLICATIONS

International Search Report of PCT/JP2010/066583 Mailed on Dec. 7, 2010 (4 pages).

* cited by examiner

*Primary Examiner* — Toan To
(74) *Attorney, Agent, or Firm* — Brinks Gilson & Lione

(57) ABSTRACT

A curtain airbag device capable of inflating and deploying without suffering a burst of a cushion part at an end of a cushion part protector near an inflator. The curtain airbag device includes a cushion part extending in a front to back direction of the vehicle, accommodated in a state rolled up from a lower end toward an upper end thereof, and inflating and deploying downward when gas is supplied thereto. The curtain airbag device includes an inflator for supplying gas to the cushion part from a predetermined position at the upper end of the cushion part, and an elongated protector 180 having an arc-like open curve cross section that is open downward and covering the cushion part, with an inner surface thereof making contact with the cushion part. The cross section of the protector being defined by the open curve, with an end point P of the open curve on a vehicle inner side smoothly going up at a first end near the inflator so that the open curve has an increasing distance between end points thereof.

17 Claims, 21 Drawing Sheets

(a)

(b)

(a)

(b)

B-B CROSS SECTION (a)

(b)

(a)

(b)

(c)

(a)

(b)

C-C CROSS SECTION

D-D CROSS SECTION (a)

(b)

CURTAIN AIRBAG DEVICE

BACKGROUND

1. Field of the Invention

The present invention relates to a curtain airbag device that inflates and deploys along one side of a vehicle interior for the purpose of protecting the occupant(s) in the event of a side collision or rollover of the vehicle.

2. Description of Related Technology

Curtain airbags that can protect occupants' heads, even if the vehicle rolls over following a side crash, are mounted in most cases to roof side rails, or the like, inside roof head trims above doors. Curtain airbags are typically mounted in a rolled up state so as to be able to be mounted in limited accommodation space.

When pressurized gas is supplied from an inflator in an emergency, the curtain airbag inflates and deploys rapidly. There is a risk that, as a result of this, a cushion part may contact an object around the roof side rail, such as a bracket of an assist grip, and burst. Consequently, curtain airbags or the like having means of covering the cushion part, such as a protector for protecting the cushion part, have been proposed (see for example Japanese Patent Application Laid-open No. 2009-23439, and also see Japanese Patent Application Laid-open No. 2006-306312 and Japanese Patent Application Laid-open No. 2006-168398).

One of the notable problems in the conventional techniques is a burst caused by choking of gas flow. Portions of the cushion part that are not covered by the protector expand freely and largely by the gas. Therefore, the gas flow may be choked at a bottle neck that may be formed at one end of the protector near the inflator, causing the cushion part to change its shape suddenly at this end, because of which the cushion part can readily burst.

SUMMARY

In view of this problem, an object of the present invention is to provide a curtain airbag device capable of inflating and deploying without suffering a burst of a cushion part at an end of a cushion part protector near an inflator.

To solve the above problem, a typical configuration of the present invention is a curtain airbag device accommodated in an upper part on one side of a vehicle interior, including: a cushion part extending in a front to back direction of the vehicle, accommodated in a state rolled up from a lower end toward an upper end thereof, and inflating and deploying downward when gas is supplied thereto; an inflator for supplying the gas to the cushion part from a predetermined position at the upper end of the cushion part; and an elongated protector having an arc-like open curve cross section open downward and covering the cushion part, with an inner surface thereof making contact with the cushion part, the cross section of the protector being defined by the open curve, with an end point of the open curve on a vehicle inner side smoothly going up at a first end of the protector near the inflator so that the open curve has an increasing distance between end points thereof.

With the structure described above, the opening of the protector is visible from inside the vehicle at the first end while it is visible only from below in the center of the protector. The protector thus has the opening smoothly increased in a flared manner at the first end near the inflator. The first end tends to form a bottle neck which causes choking of the gas flow in part of the cushion part that is not covered by the protector and has expanded freely and largely. However, since the opening of the protector is smoothly increased at the first end thereof near the inflator as described above, the shape of the cushion part also changes smoothly to conform therewith, so that a burst is unlikely to occur.

The protector preferably covers the cushion part between the inflator and a pillar on one side of the vehicle interior, the cross section of the protector being defined by the open curve, with the end point of the open curve the a vehicle inner side smoothly going up at a second end of the protector near the pillar so that the open curve has an increasing distance between end points thereof.

According to the present invention, it is possible to provide a curtain airbag device capable of inflating and deploying without suffering a burst of a cushion part at an end of a cushion part protector near an inflator.

DETAILED DESCRIPTION

Figure 1:
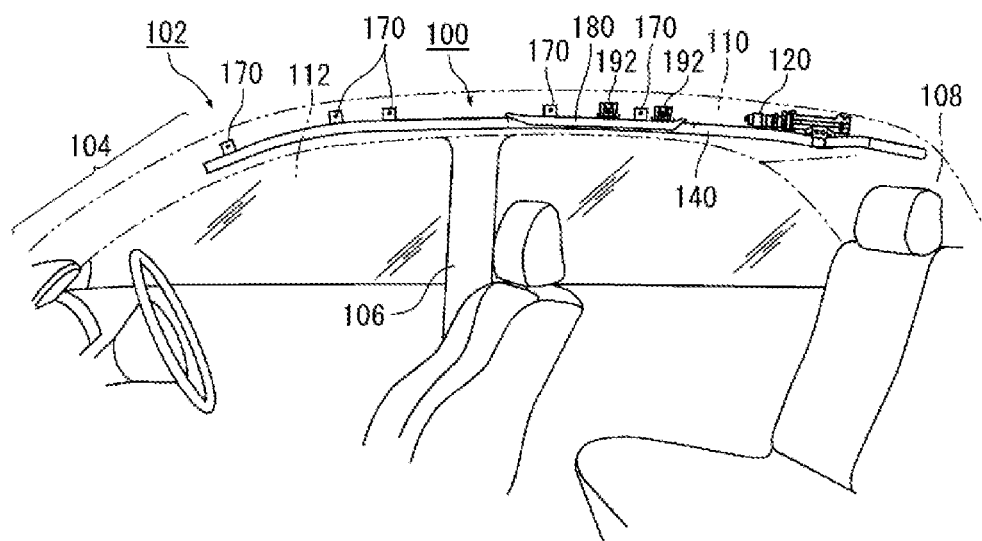
FIGS. 1(a) and 1(b) are views illustrating a first embodiment of the curtain airbag device according to the present invention.
Figure 1:
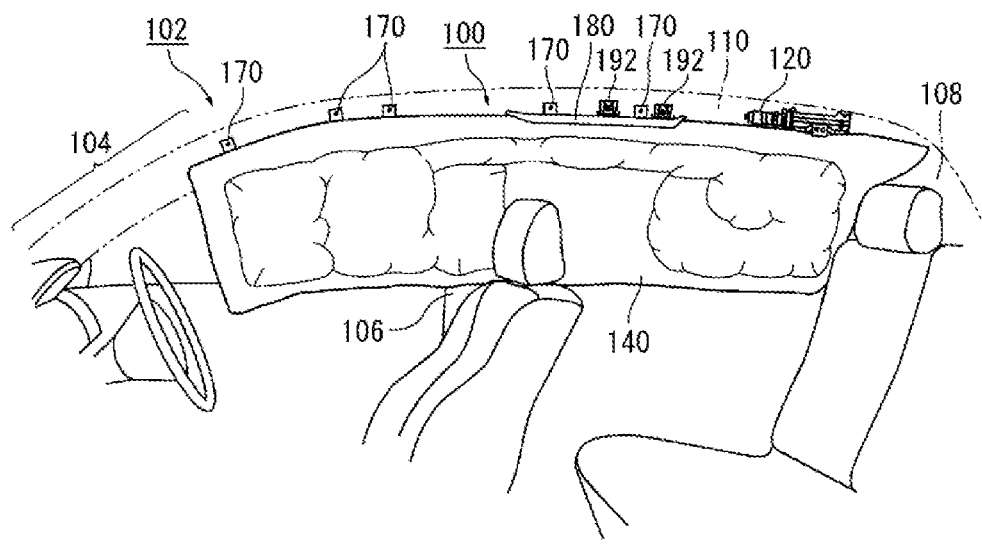

Preferred embodiments of the present invention will be hereinafter described in detail with reference to the accompanying drawings. Sizes, materials, or other specific numbers or amounts shown in these embodiments are provided only for illustration of the invention to facilitate understanding thereof and should not be interpreted to limit the invention unless otherwise specifically stated. Same reference numerals will be given to the elements having substantially the same function and configuration throughout the specification and the drawings in order to avoid repetitive description, and elements not directly related to the present invention will not be illustrated.

First Embodiment

FIGS. 1(a) and 1(b) are views illustrating a first embodiment of the curtain airbag device according to the present invention. FIG. 1(a) and FIG. 1(b) illustrate the curtain airbag device 100 when not deployed and when deployed, respectively. While all the embodiments below will be described as a curtain airbag device for a right side face of a vehicle 102 as shown in FIG. 1, it should be understood that the curtain airbag device for the left side face has the same structure mirrored to the other side.

The curtain airbag device 100 can be accommodated in an upper part on one side of the vehicle interior as shown in FIG. 1(a). The curtain airbag device 100 is mounted to a roof side rail 110. Typically, there are a plurality of pillars on one side of the vehicle interior. These are called a front pillar (A pillar 104), a center pillar (B pillar 106), and a rear pillar (C pillar 108), from the front of the vehicle 102. The pillars are each covered by pillar trims formed by a cushion material or the like inside the vehicle to enhance the aesthetic effect of the vehicle interior.

The curtain airbag device 100 includes a cushion part 140 extending in the front to back direction of the vehicle as shown in FIG. 1(a) and accommodated in a state rolled up from the lower end to the upper end thereof. The cushion part 140 is formed into a bag shape by sewing the base fabric forming the surface of the cushion on the front and the back, or by weaving with the use of OPW (One-Piece Woven) fabric.

The curtain airbag device 100 also includes a cylindrical inflator 120, which supplies gas to the cushion part 140 from a predetermined position at the upper end of the cushion part 140. In the event of a side crash or rollover of the vehicle 102, first, a sensor (not shown) equipped in the vehicle 102 senses the impact, and transmits an ignition signal to the inflator 120. Next, the propellant burns in the inflator 120 and the generated gas is supplied to the cushion part 140.

With the gas supplied from the inflator 120, the cushion part 140 inflates and deploys downward along the side of the vehicle interior (such as a side window 112 or the like) as shown in FIG. 1(b) for protecting the occupant(s). With this cushion part 140, occupants in the front seat and the back seat can be protected.

Figure 2:
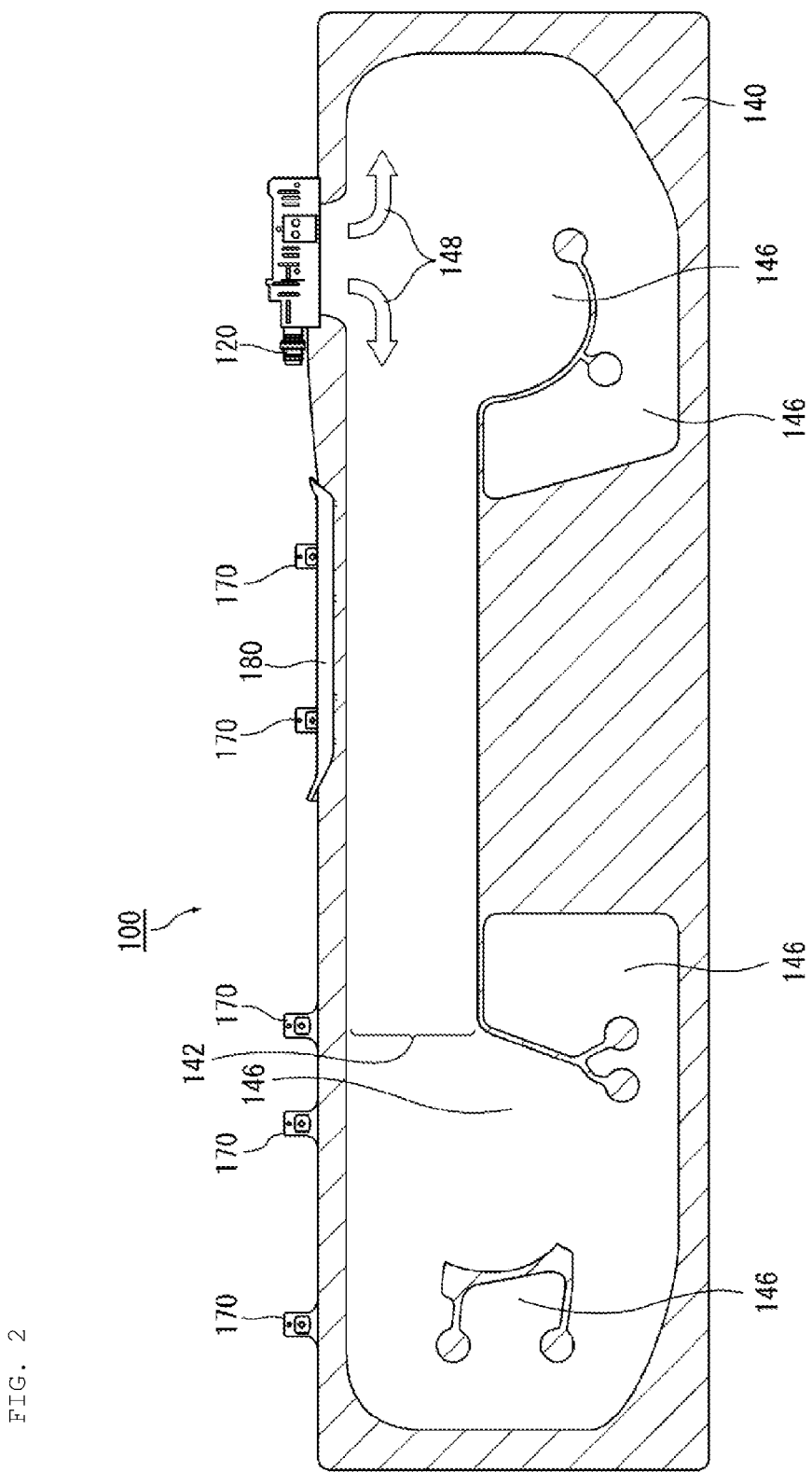
FIG. 2 is a view illustrating a deployed state of the curtain airbag device of FIG. 1.

FIG. 2 is a view illustrating a deployed state of the curtain airbag device of FIG. 1. FIG. 2 is a view of the curtain airbag device 100 on the right side, when facing forward of the vehicle 102, viewed from inside the vehicle.

The cushion part 140 includes a main duct 142 and a plurality of chambers 146. The main duct 142 is disposed substantially horizontally in the upper part of the cushion part 140 and diverts the gas 148 flowing from the inflator 120 in the front and back directions of the vehicle into the plurality of chambers 146 arranged at positions in the front to back direction of the vehicle. The plurality of chambers 146 are the parts that will make direct contact with an occupant in an emergency such as a crash. The occupant(s) is/are protected by these plurality of chambers 146 from crashing against the side of the vehicle or flying out of the vehicle.

Figure 3:
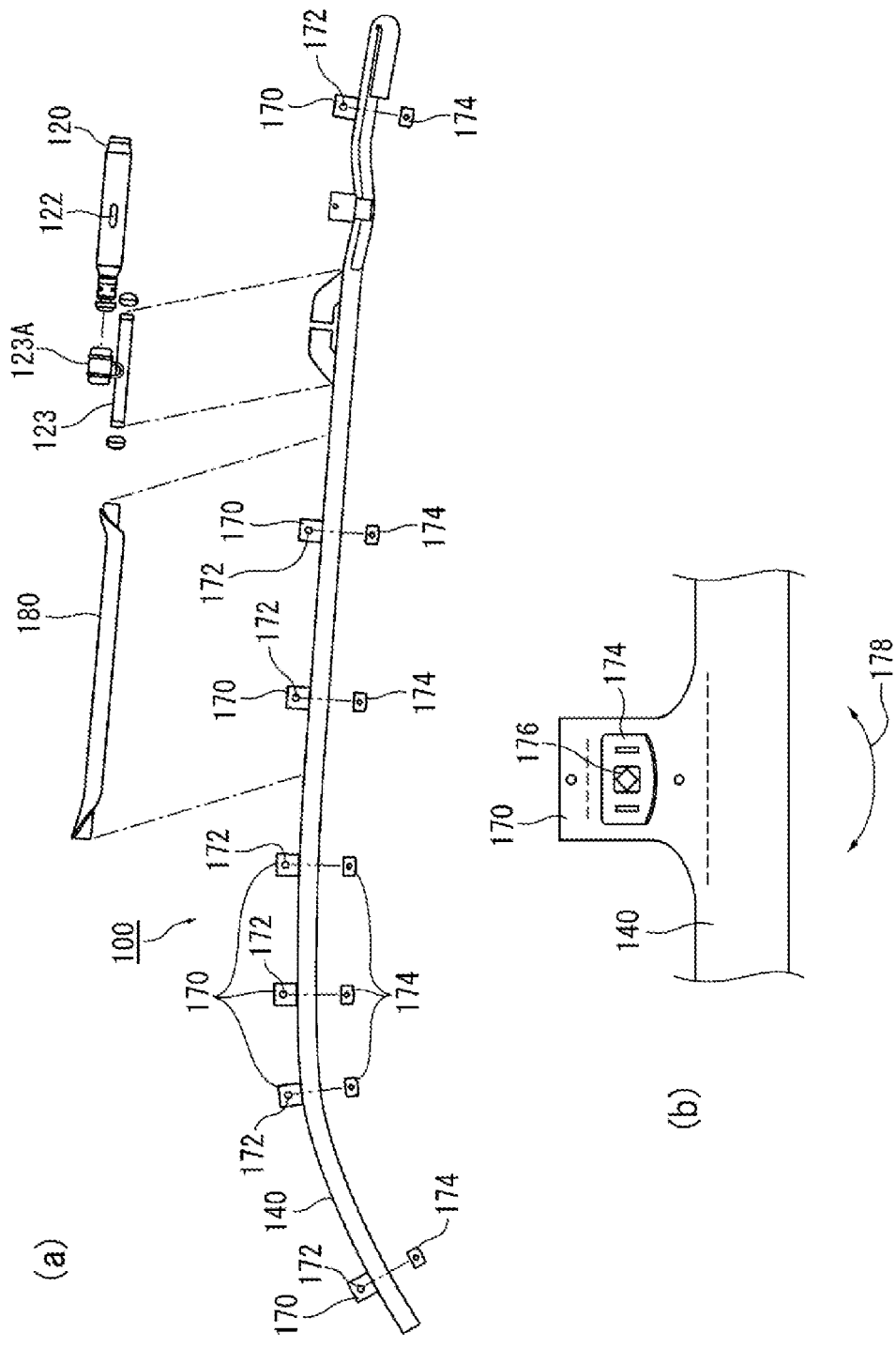
FIGS. 3(a) and 3(b) are an exploded view of the curtain airbag device of FIG. 1(a) and an enlarged view of a portion thereof, respectively.

FIG. 3 is an exploded view of the curtain airbag device 100 of FIG. 1(a). In FIG. 3(a), the cushion part 140 is in a rolled up, accommodated state. The cylindrical inflator 120 includes a gas ejection port 122, and inserted into an inflator insertion part 123A of a gas guide 123. After being inserted, the inflator 120 is accommodated such as to protrude at the predetermined position at the upper end of the cushion part 140 as illustrated in FIG. 2. Gas 148 ejected from the gas ejection port 122 is distributed by the gas guide 123 in the front and back directions of the vehicle.

FIG. 3(b) is a partial enlarged view of FIG. 3(a). The cushion part 140 has a plurality of tabs (cushion tabs 170) attached to the upper end thereof at positions in the front to back direction of the vehicle. The cushion tab 170 is a strip-like member attached to the upper end of the cushion part 140 and provided with a bolt hole 172. A fixture piece 174 is attached to each cushion tab 170 such that a square bolt hole 176 of the fixture piece 174 overlaps the bolt hole 172 of the cushion tab 170. FIG. 3(b) illustrates this state. A square head bolt is inserted and fastened in this square bolt hole 176 to secure the curtain airbag device 100 to the roof side rail 110 such as not to rock as indicated by an arrow 178.

The characteristic feature of the curtain airbag device 100 is that it includes an elongated protector 180 covering the cushion part 140. The protector 180 will be described below.

(Protector)

Figure 4:
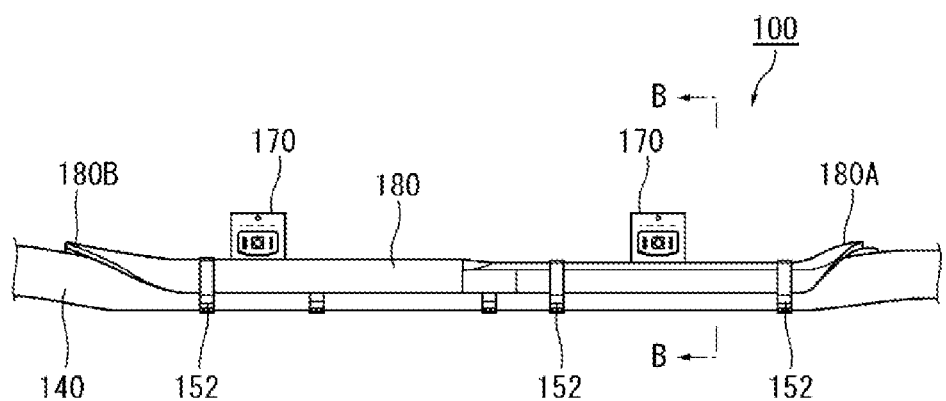
FIGS. 4(a) and 4(b) are views illustrating the details of the protector of FIG. 3(a)
Figure 4:
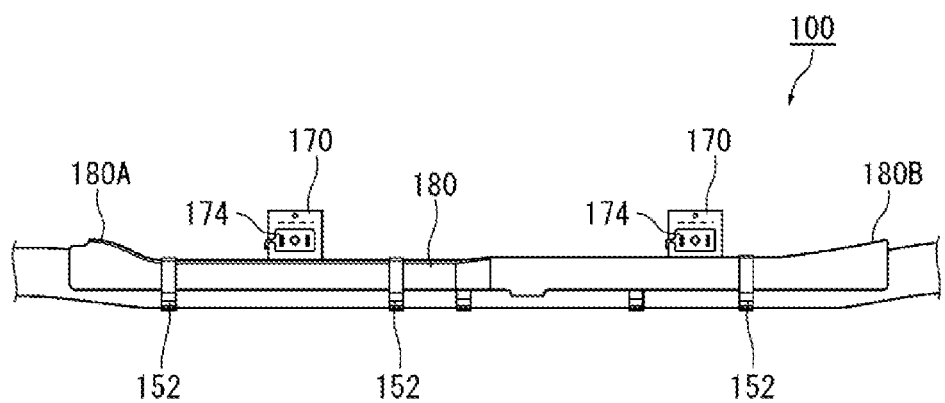

FIG. 4 is a view illustrating the details of the protector of FIG. 3(a). FIG. 4(a) and FIG. 4(b) show the protector 180 viewed from inside and outside the vehicle, respectively.

Figure 5:
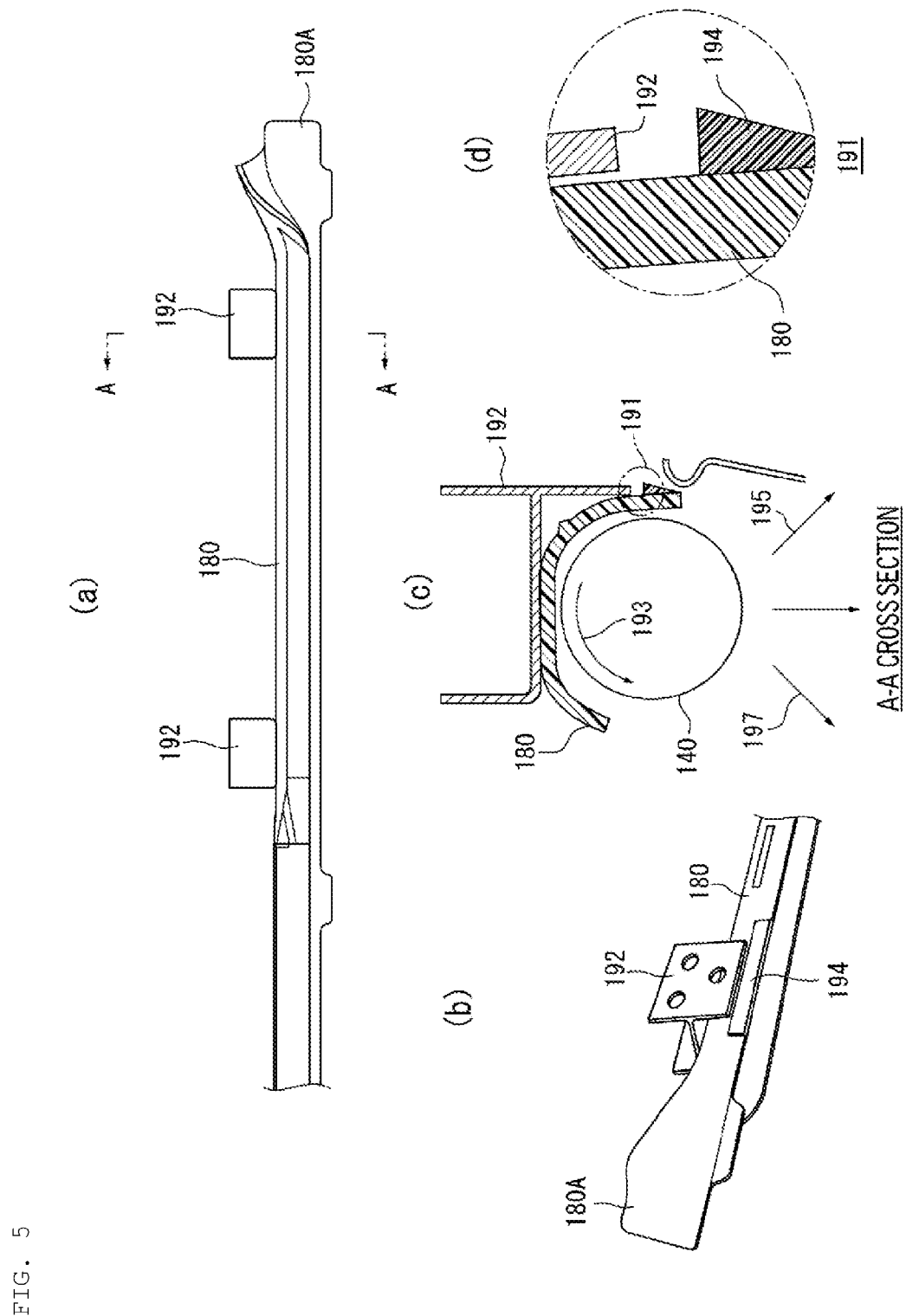
FIGS. 5(a)-(d) show parts of the protector of FIG. 4 to a larger scale.

FIG. 5 shows parts of the protector 180 of FIG. 4 to a larger scale. FIG. 5(a) is a partial enlarged view of the first end 180A of the protector 180 near the inflator 120 viewed from inside the vehicle. FIG. 5(b) is a perspective view of the first end 180A viewed from outside the vehicle. FIG. 5(c) is a cross section along A-A of FIG. 5(a), and FIG. 5(d) is an enlarged view of a region 191 of FIG. 5(c). In FIG. 5, the cushion part 140 is not illustrated except in FIG. 5(c).

As illustrated in FIG. 5, the vehicle body is provided with assist grip brackets 192. The assist grip brackets 192 are brackets for securing assist grips (not shown) for occupants to hold onto, i.e., grips for occupants to hold onto when the occupants get into or out of the vehicle 102 or when the vehicle body shakes. Although the assist grip brackets 192 are not secured to the protector 180, they can be called a fixed member secured to the vehicle body in the periphery of the protector 180. Note, FIG. 2 to FIG. 4 do not illustrate the assist grip brackets 192.

The protector 180 may be attached at any position of the cushion part 140. However, the initial purpose of attaching the protector 180 is to prevent a burst or the like of the cushion part 140 caused by making contact with a peripheral object when it inflates and deploys. Therefore, the protector 180 should preferably be attached in the periphery of a location where there is an object, in particular, such as an assist grip bracket 192, which may cause a burst of the cushion part 140 when the cushion part 140 crashes against it.

The protector 180 has an arc-like open curve cross section opening downward as illustrated in FIG. 5(*c*) and others and covers the cushion part 140, with its inner surface touching the cushion part 140.

The protector 180 includes a rotation preventing portion 194 integral therewith as illustrated in FIG. 5(*b*) to FIG. 5(*d*). The rotation preventing portion 194 is a member for preventing rotation 193 (indicated by an arrow in FIG. 5(*c*)) of the cushion part 140 by abutting against the assist grip bracket 192.

When gas is supplied from the inflator 120 in an emergency, the main duct 142 at the upper end of the cushion part 140 inflates and deploys first, which may have such an impact on the cushion part 140 to rotate 193. Such an accidental rotation 193 may cause the cushion part 140 to deploy in an unfavorable direction. If rotated 193, for example, the cushion part 140 may deploy too much toward outside 195 of the vehicle as shown in FIG. 5(*c*), in which case the cushion part may get caught by the B-pillar 106 and end up failing to deploy.

Depending on how the cushion part 140 is rolled up, the cushion part 140 may rotate oppositely from the rotation 193 at the beginning of the inflation and deployment. In that case, the cushion part 140 will deploy too much toward inside 197 of the vehicle as shown in FIG. 5(*c*) over the heads of the occupants, and may fail to serve the purpose of protecting the occupants.

Therefore, this embodiment noted the fact that the protector 180 for protecting the cushion part 140 is secured to the cushion part 140 with adhesive tapes 152 (FIG. 4) so that when the cushion part 140 tries to rotate, the protector 180 also undergoes rotation 193 therewith. The protector 180 is provided with the rotation preventing portion 194, which abuts against the assist grip bracket 192 when the protector tries to rotate, whereby an accidental rotation 193 of the cushion part at the beginning of the inflation and deployment is prevented. Accordingly, the cushion part is deployed appropriately in a stable direction of deployment as illustrated with an arrow 199 in FIG. 5(*c*) between the side of the vehicle interior and the occupants.

The characteristic feature of this embodiment, therefore, is the use of the protector 180, which is originally provided for preventing damage such as a burst of the cushion part 140, to help prevent rotation, by means of the rotation preventing portion 194 provided as described above.

The rotation preventing portion 194 may abut against any other member secured in the periphery of the roof side rail 110 (fixed member) and not limited to the assist grip bracket 192.

While rotation 193 of FIG. 5(*c*) is prevented in this embodiment, the rotation preventing portion may be provided at a position where the rotation preventing portion will abut against the assist grip bracket 192 when the protector 180 rotates oppositely, in order to prevent rotation in the opposite direction. In this case, too, the rotation preventing portion may be integral with the protector 180, and the rotation preventing portion may abut against the above-described fixed member.

As illustrated in FIG. 5, the rotation preventing portion 194 protrudes from the protector 180. This is because the rotation preventing portion 194 can be installed more easily if it protrudes in this way when assembling the rotation preventing portion 194 to the position where it will abut against the assist grip bracket 192 when the cushion part 140 tries to rotate.

Although it will involve more complex installation procedures, a concave rotation preventing portion (not shown) may be provided to the protector 180 to fit a fixed member such as the assist grip bracket 192 into the concave portion.

Figure 6:
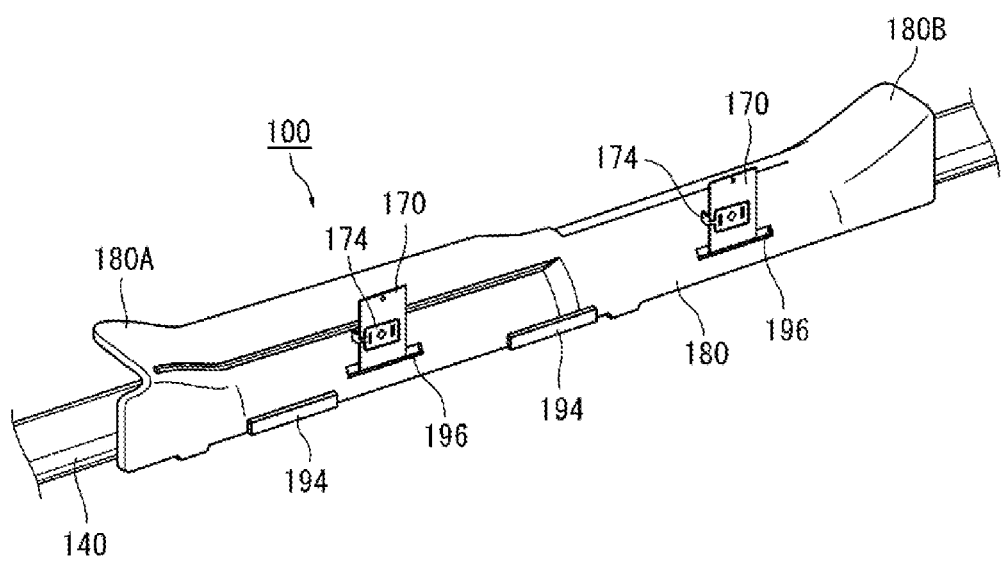
FIG. 6 is a perspective view of the curtain airbag device of FIG. 4(b)
Figure 7:
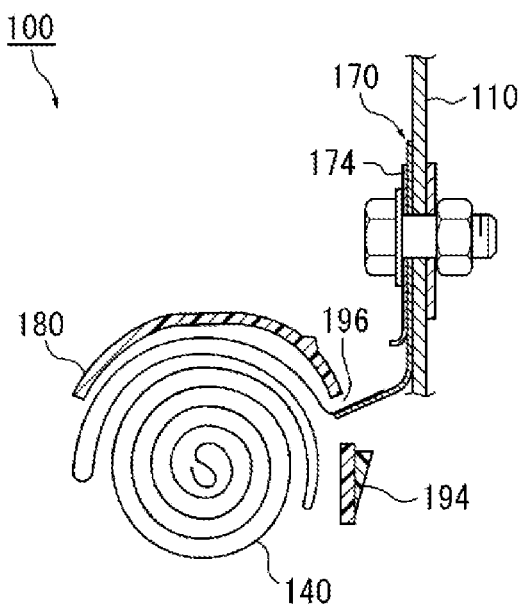
FIG. 7 is a cross section generally taken along line B-B of FIG. 4(a)

FIG. 6 is a perspective view of the curtain airbag device 100 of FIG. 4(*b*), and FIG. 7 is a cross section along B-B of FIG. 4(*a*). The curtain airbag device 100 further includes a position alignment means for aligning the positions of the cushion part and the protector so that the protector 180 covers the rolled-up cushion part 140 at a predetermined position. The position alignment means in this embodiment refers to a slit 196 provided in the protector 180 and a cushion tab 170 of the cushion part 140.

As illustrated in FIG. 6 and FIG. 7, with the cushion tab 170 passing through the slit 196 of the protector 180, both the protector 180 and the cushion part 140 are positioned relative to each other and not misaligned. Positioning is achieved far more firmly as compared to the fixing means such as the adhesive tapes 152 securing the protector 180 to the cushion part 140 (See FIG. 4. Not shown in FIG. 6 and FIG. 7).

With the structure described above, after the fixed positional relationship is established between the protector 180 and the cushion part 140 as shown in FIG. 7, the curtain airbag device 100 is assembled to the roof side rail 110 as shown in FIG. 5(*c*). The device is assembled to a position where the rotation preventing portion 194 integral with the protector 180 will abut against the assist grip bracket 192 when the cushion part 140 tries to rotate at the beginning of the inflation and deployment. By being assembled in this manner, the protector 180 will be fixedly oriented relative to the vehicle body. Since the positional relationship between the protector 180 and the cushion part 140 has already been fixedly established, the cushion part 140 will also be fixedly oriented relative to the vehicle body. Thus, rotation of the cushion part 140 during assembly of the curtain airbag device 100 is also prevented.

(Protector Ends Shape)

Figure 8:
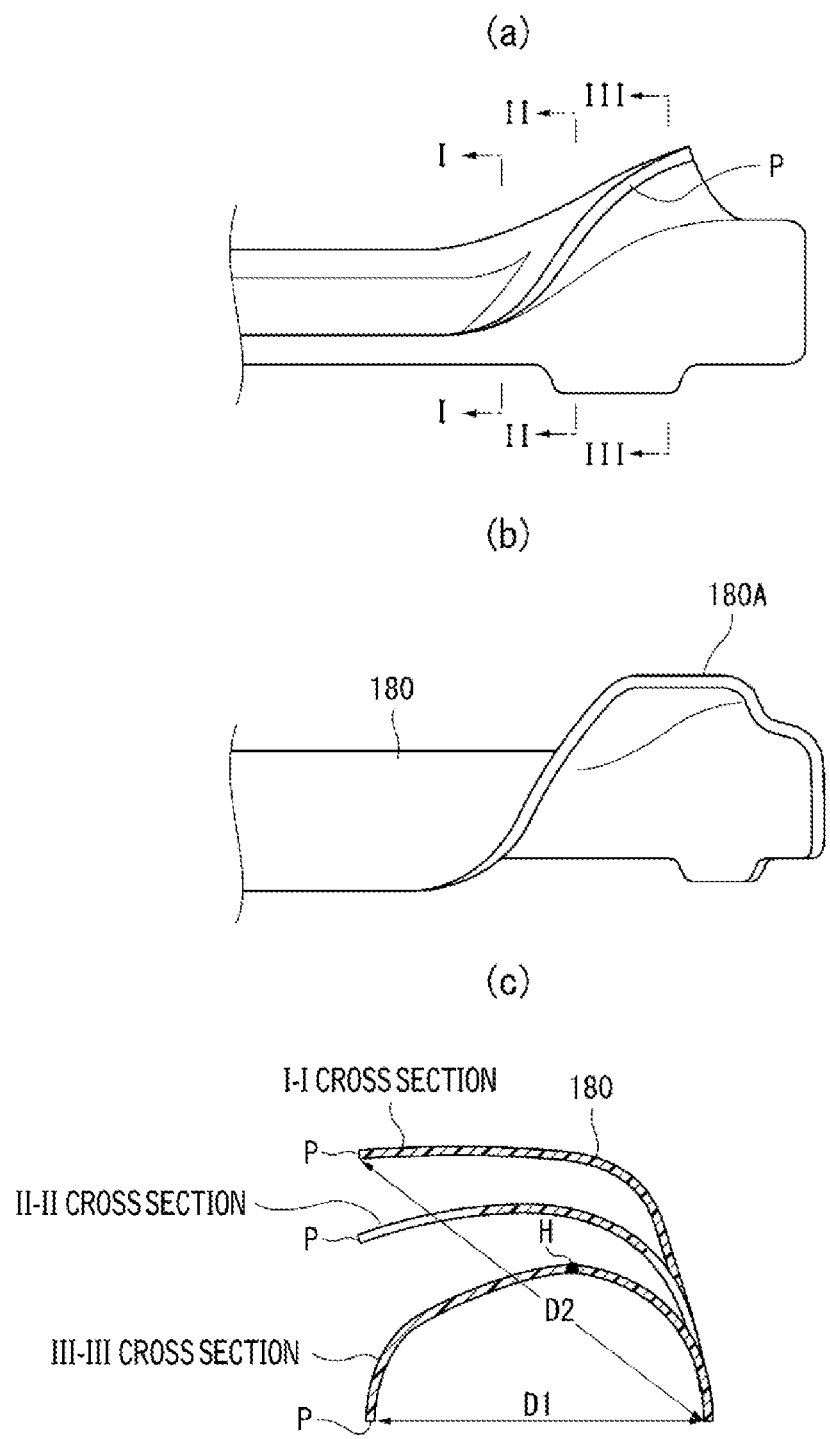
FIGS. 8(a)-(c) are views illustrating the shape of a first end of the protector of FIG. 1 near the inflator.

FIG. 8 is a view illustrating the shape of a first end 180A of the protector of FIG. 1 near the inflator 120. FIG. 8(*a*) shows the first end 180A viewed from inside the vehicle, FIG. 8(*b*) is a perspective view of the first end 180A, and FIG. 8(*c*) is a diagram illustrating transitions of the cross-sectional shape of the first end 180A. As illustrated in FIG. 8(*c*), the cross section of the protector 180 changes such that an end point P on the vehicle inner side of the open curve forming the cross section goes up smoothly at the first end 180A near the inflator 120. Namely, the shape of the open curve changes sequentially from a cross section I-I via a cross section II-II to a cross section III-III as illustrated in FIG. 8(*c*) toward the first end 180A. As a result, the distance between the two end points of the open curve increases from distance D1 to distance D2. This flared (horn-like) shape of the first end 180A will be referred to as "choke preventing shape".

In this embodiment, the end point P on the vehicle inner side of the open curve goes up beyond the upper end H in the center of the protector 180. Meanwhile, the open curve maintains the arc-like or substantially L-shaped form.

With the structure described above, as illustrated in FIG. 5(*a*) or FIG. 8(*b*), the opening of the protector 180 is visible from inside the vehicle at the first end 180A while it is visible only from below in the center of the protector. The protector 180 thus has the choke preventing shape, with the opening smoothly increased in a flared manner at the first end 180A near the inflator 120.

Figure 9:
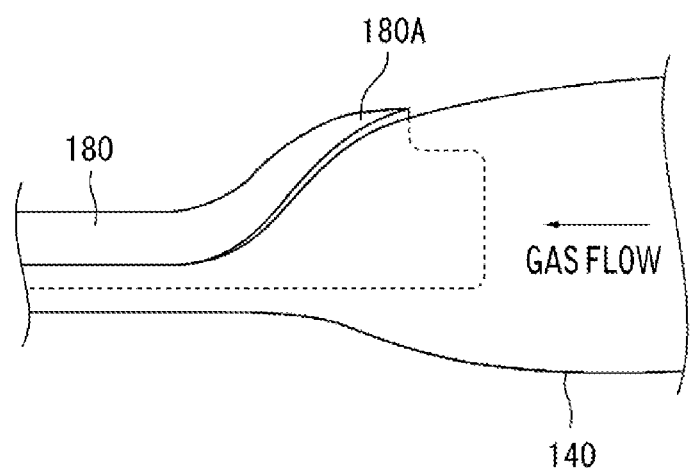
FIGS. 9(a) and 9(b) are views illustrating the effect of the choke preventing shape of FIG. 8.
Figure 9:
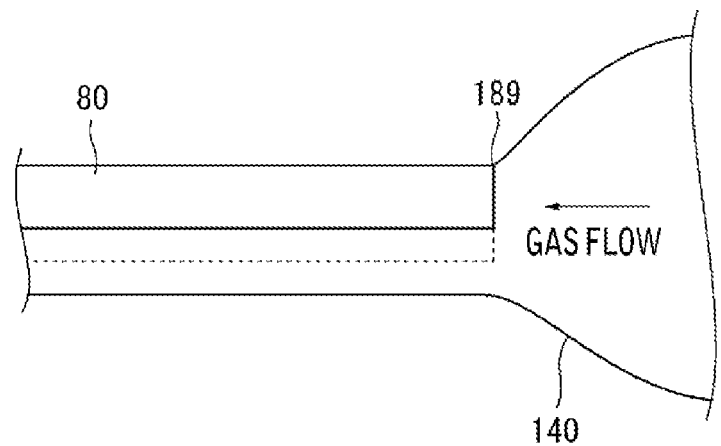

FIG. 9 is a view explaining the effect of the choke preventing shape of FIG. 8. The first end 180A tends to form a bottle neck which causes choking of the gas flow in part of the cushion part 140 that is not covered by the protector 180 and has expanded freely and largely. However, since the opening of the protector 180 is smoothly increased at the first end near the inflator 120 as described above, the shape of the cushion part 140 also changes smoothly to conform therewith as shown in FIG. 9(*a*), so that a burst is unlikely to occur.

The opening is widened toward inside of the vehicle at the first end. This is for allowing escape of the inflated part of the cushion part 140 toward inside of the vehicle where there is more space. The end point on the vehicle inner side of the open curve forming the cross section of the cushion part 140 goes up along a trajectory which is, as illustrated in FIG. 5(*a*), a curve having inflection points analogous to those of a hysteresis curve.

Meanwhile, if a protector 80 with its opening not increased as described above at an end near the inflator 120 were used, the cushion part 140 would have its shape changed at an acute angle as illustrated in FIG. 9(*b*), and a burst would easily occur in particular at a point 189 where the cushion part 140 starts to be covered by the protector 180.

Figure 10:
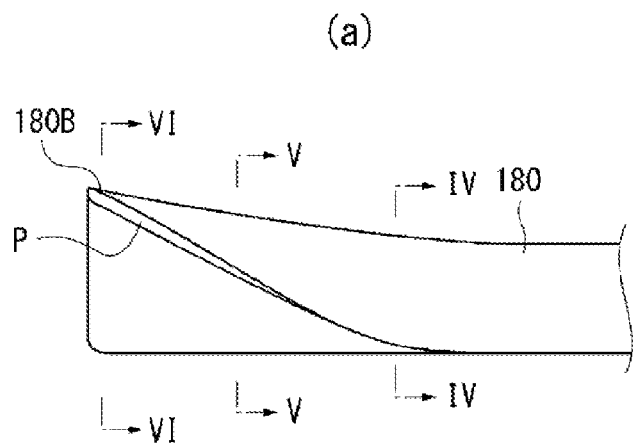
FIGS. 10(a)-(c) are views illustrating the shape of a second end of the protector of FIG. 1 near a B pillar.
Figure 10:
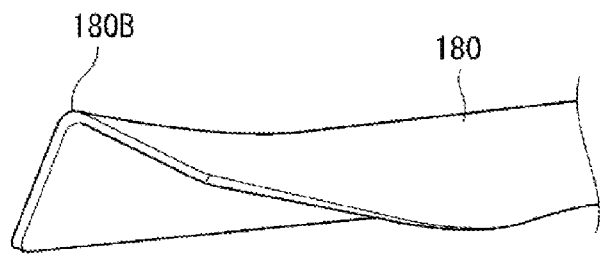
Figure 10:
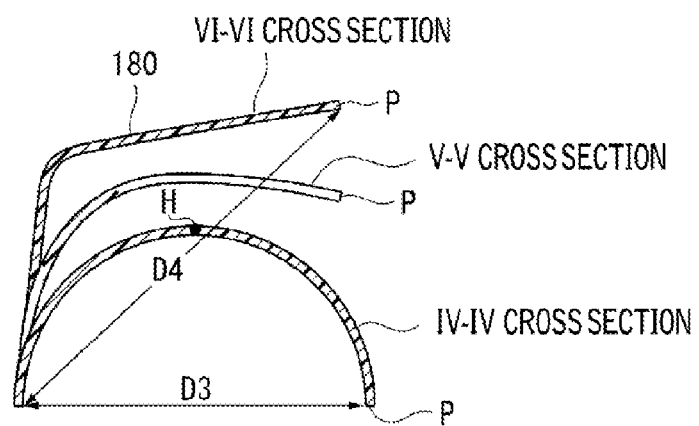

FIG. 10 is a view illustrating the shape of a second end 180B of the protector 180 of FIG. 1 near the B pillar 106. FIG. 10(*a*) shows the second end 180B viewed from inside the vehicle, FIG. 10(*b*) is a perspective view of the second end 180B, and FIG. 10(*c*) is a diagram illustrating transitions of the cross-sectional shape of the second end 180B.

The protector 180 covers the cushion part 140 between the inflator 120 and the B-pillar 106 on the side of the vehicle interior as illustrated in FIG. 1, and extends to immediately before the B-pillar 106. The cross section of the protector 180 changes such that an end point P on the vehicle inner side of the open curve forming the cross section goes up smoothly at the second end 180B near the B-pillar 106. Namely, the shape of the open curve changes sequentially from a cross section IV-IV via a cross section V-V to a cross section VI-VI as illustrated in FIG. 10(*c*) toward the second end 180B.

As compared to the short rising trajectory similar to a hysteresis curve at the first end 180A, the end point P on the vehicle inner side goes up along a longer, linear trajectory at the second end 180B. As a result, the distance between the two end points of the open curve increases from distance D3 to distance D4. This flared shape of the second end 180B will be referred to as "gas flow adjusting shape".

The end point P on the vehicle inner side of the open curve goes up beyond the upper end H in the center of the protector 180 at the second end 180B, too. Meanwhile, the open curve maintains the arc-like or substantially L-shaped form.

With the structure described above, as illustrated in FIG. 10(*a*) and FIG. 10(*b*), the opening of the protector 180 is visible from inside the vehicle at the second end 180B while it is visible only from below in the center of the protector. The protector 180 thus has the gas flow adjusting shape, with the opening smoothly increased in a flared manner, also at the second end 180B near the B-pillar 106.

Figure 11:
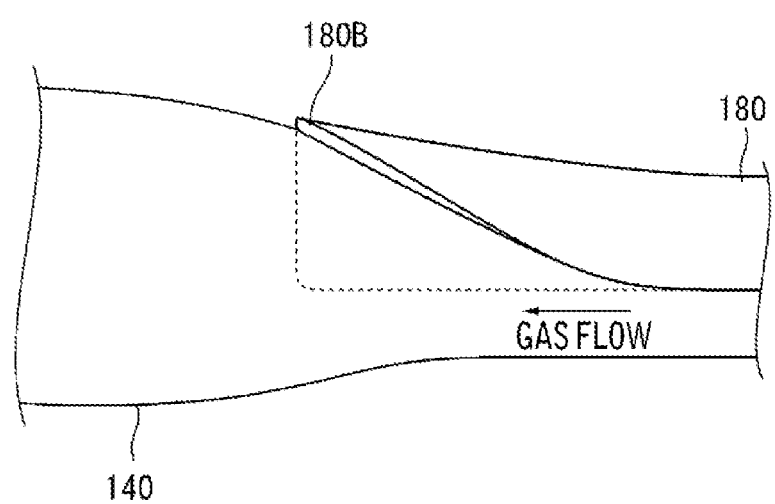
FIGS. 11(a) and 11(b) are views illustrating the effect of the gas flow adjusting shape of FIG. 10.
Figure 11:
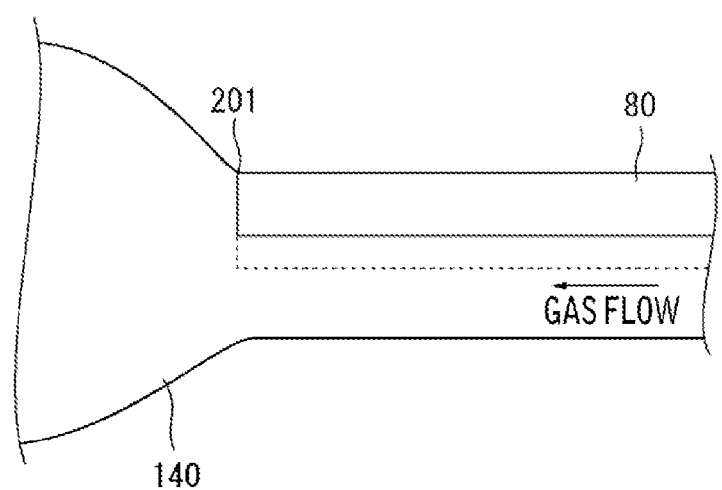

FIG. 11 is a view explaining the effect of the gas flow adjusting shape of FIG. 10. With this gas flow adjusting shape, the opening of the protector is increased toward inside of the vehicle. The opening is widened toward inside of the vehicle at the second end similarly to the first end. The cushion part 140 inflates toward inside of the vehicle smoothly conforming to this gas flow adjusting shape as illustrated in FIG. 11(*a*) immediately before reaching a B-pillar garnish and is prevented from inflating toward outside of the vehicle (toward the side face of the vehicle). Therefore, the cushion part 140 is capable of smoothly inflating and deploying toward inside of the vehicle without colliding with the pillar garnish of the B-pillar 106.

Meanwhile, if a protector 80 with its opening not increased as described above at an end near the B-pillar were used, the cushion part 140 could not be prevented from rapidly inflating and deploying toward outside of the vehicle as illustrated in FIG. 11(*b*), and may get caught by the pillar garnish and inhibited from deploying.

Second Embodiment

Figure 12:
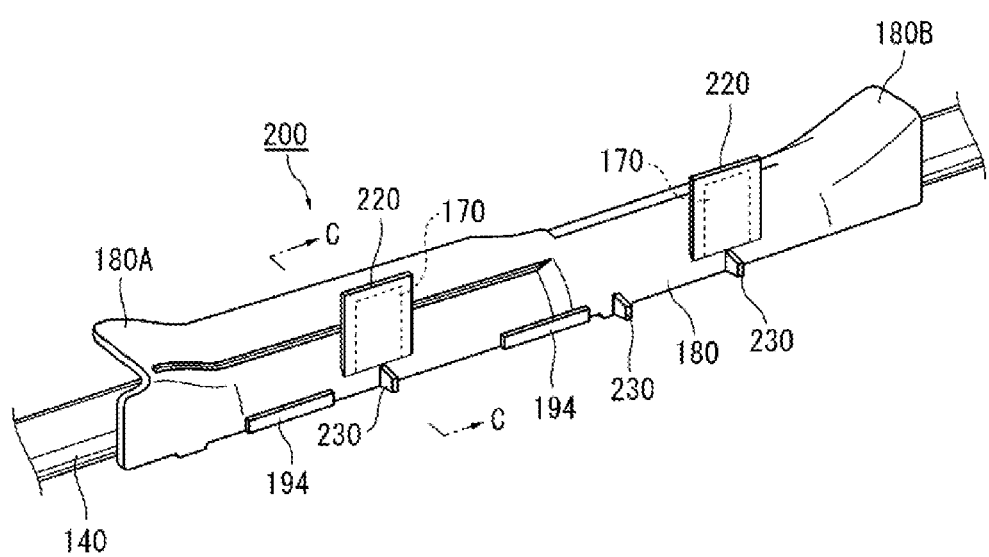
FIG. 12 is a perspective view illustrating a second embodiment of the curtain airbag device according to the present invention.

FIG. 12 is a perspective view illustrating a second embodiment of the curtain airbag device according to the present invention. Below, the configuration that is the same as that of the first embodiment will not be described again. The characteristic feature of the protector 210 of the curtain airbag device 200 according to this embodiment is that, as illustrated in FIG. 12, the protector includes a plurality of protector tabs 220 integral with the protector 280 disposed along a longitudinal line of its outer surface and secured to the vehicle body. As the plurality of protector tabs 220 provided along a substantially straight line are secured to the vehicle body, the cushion part 140 is prevented from being twisted when mounted.

Figure 13:
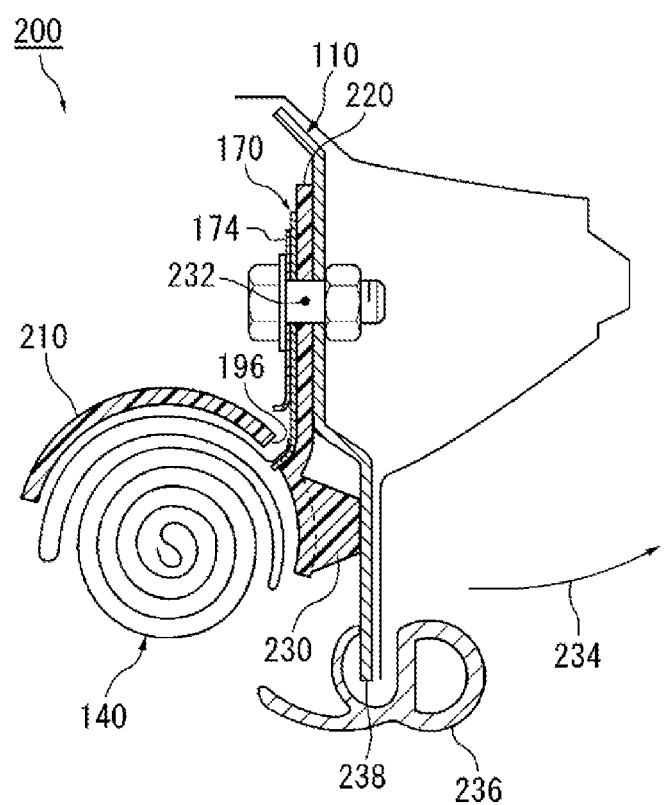
FIG. 13 is a cross section generally taken along line C-C of the curtain airbag device of FIG. 12.

FIG. 13 is a cross section along C-C of the curtain airbag device 200 of FIG. 12, illustrating the state in which the device is mounted to the vehicle body together with the cushion part 140. The cushion part 140 includes a plurality of cushion tabs 170 secured to the vehicle body at an upper end thereof, similarly to the first embodiment. The protector 210 further includes slits 196 (hidden by the protector tabs 220 and not visible in FIG. 12) at positions corresponding to the cushion tabs 170 (vehicle inner side of the protector tab 220), the cushion tabs 170 being passed through the slits 196 and secured to the vehicle body as shown in FIG. 13. This positions the protector 210 appropriately relative to the cushion part 140 so as to cover the cushion part 140 at a correct position.

The plurality of cushion tabs 170 at the upper end of the cushion part 140 are overlapped on the protector tabs 220 located at corresponding positions and they are attached to the vehicle body together (two tabs fastened together). These cushion tabs 170 and protector tabs 220 being overlapped and secured at a plurality of positions in this manner can also allow proper positioning of the protector 210 relative to the cushion part 140 so that the protector covers the cushion part at a correct position. Namely, the positional relationship between the protector 210 and the cushion part 140 is fixedly established.

With the structure described above, the protector 210 is attached to the vehicle body without being twisted, owing to the protector tabs 220 integral with the protector 210 secured to the vehicle body. If the protector 210 is appropriately positioned relative to the cushion part 140, covering the cushion part 140 at a correct position, the cushion part 140 will not be twisted to the vehicle body, either. Thus, the cushion part 140 is prevented from being twisted during assembly of the curtain airbag device 200.

On the other hand, if the protector tabs 220 were not provided, although the resin-made protector 210 has higher rigidity than the cushion part 140 made of fabric, if the protector 210 itself is twisted, the cushion part 140 may be twisted to the vehicle body, even though the protector 210 and the cushion part 140 are positioned appropriately to each other. This embodiment solves such a problem.

As illustrated in FIG. 12 and FIG. 13, the protector 210 further includes protrusions (ribs 230) integral with the protector, protruding into a gap between the protector 210 and the vehicle body. There may be a plurality of such ribs 230 as in this embodiment, or there may be one rib. The rib does not need to have a shape that fills up the gap, nor does it need to contact the vehicle body.

With the structure described above, the ribs 230 filling up the gap mentioned above prevent an accidental swing motion 234 in a pendulum manner around a fixed point 232 of the protector tab as shown in FIG. 13 as the pivot during inflation and deployment. In other words, the ribs keep the cushion part 140 apart from the vehicle body, which prevents a phenomenon in which the inflating and deploying cushion part 140 crashes against the weather strip 236, knocks the weather strip 236 off, and contacts an exposed edge 238 of the vehicle body panel, resulting in a burst.

Third Embodiment

Figure 14:
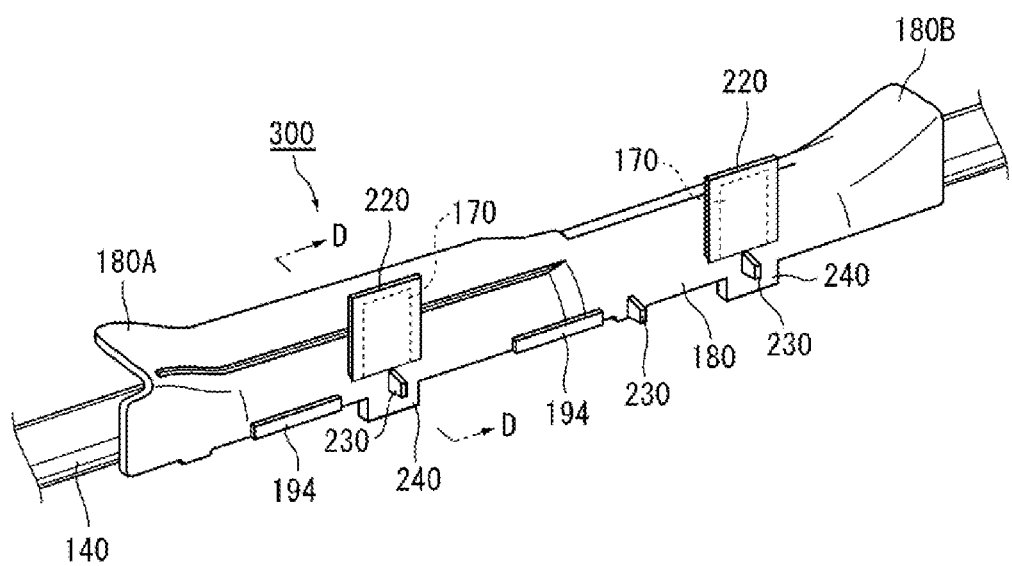
FIG. 14 is a perspective view illustrating a third embodiment of the curtain airbag device according to the present invention.
Figure 15:
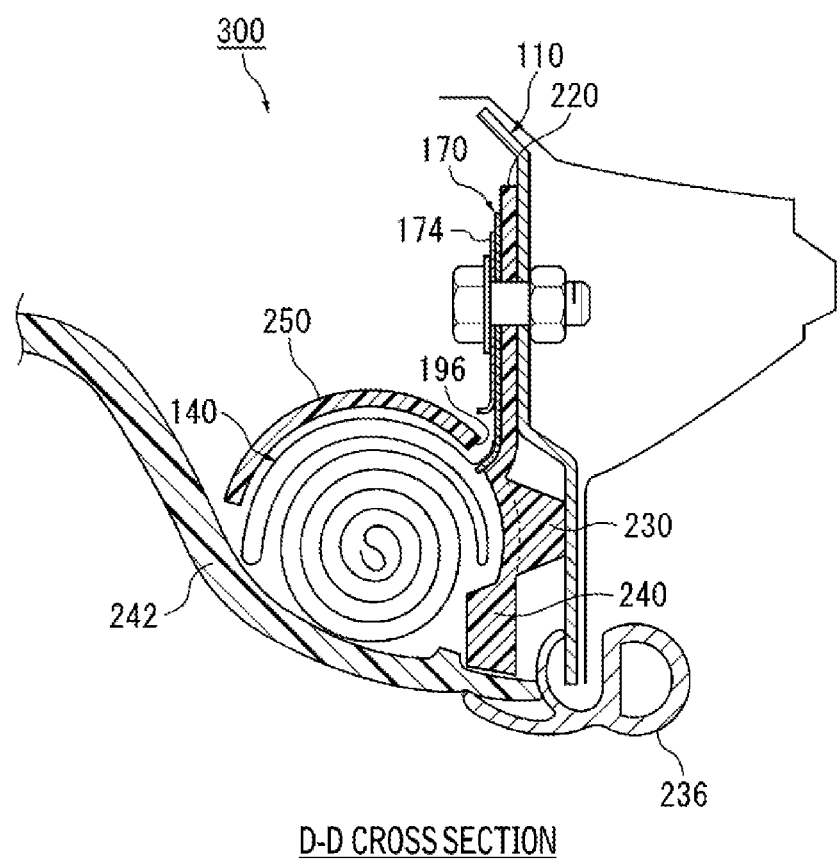
FIG. 15 is a cross section generally taken along line D-D of FIG. 14.

FIG. 14 is a perspective view illustrating a third embodiment of the curtain airbag device according to the present invention, and FIG. 15 is a cross section along D-D of FIG. 14. The curtain airbag device 300 according to this embodiment will be described below, but the same configuration as that of the second embodiment will not be described again. The characteristic feature of the protector 250 in the third embodiment is that the protector further includes extensions 240 making contact with an upper surface of the vehicle interior ceiling 242. As illustrated in FIG. 14, the extensions 240 should preferably be provided directly below the protector tabs 220 having high rigidity. With this structure, occupants can be prevented from having a loose feeling of the ceiling 242 when they contact the vehicle interior ceiling 242 for some reason. The extensions 240 need not be kept always in contact with the vehicle ceiling 242, i.e., there may be a 1 to 3 mm clearance.

Fourth Embodiment

Figure 16:
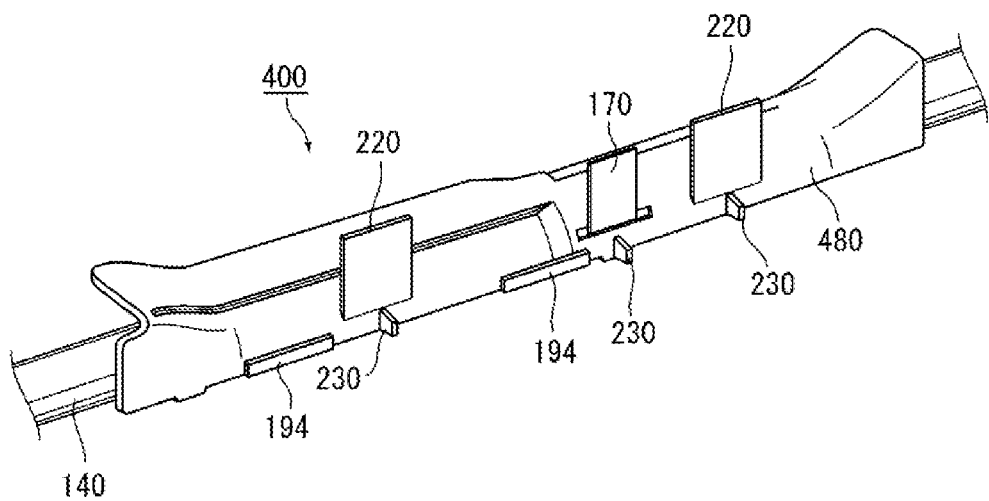
FIG. 16 is a perspective view illustrating a fourth embodiment of the curtain airbag device according to the present invention.

FIG. 16 is a perspective view illustrating a fourth embodiment of the curtain airbag device according to the present invention. The protector 480 of the curtain airbag device 400 according to this embodiment has the protector tabs 220 and the cushion tabs 170 offset from each other so that they cannot be overlapped and fastened together as in the third embodiment (FIG. 13). In such a case, the protector tabs 220 and the cushion tabs 170 are separately secured to the vehicle body.

Fifth Embodiment

Figure 17:
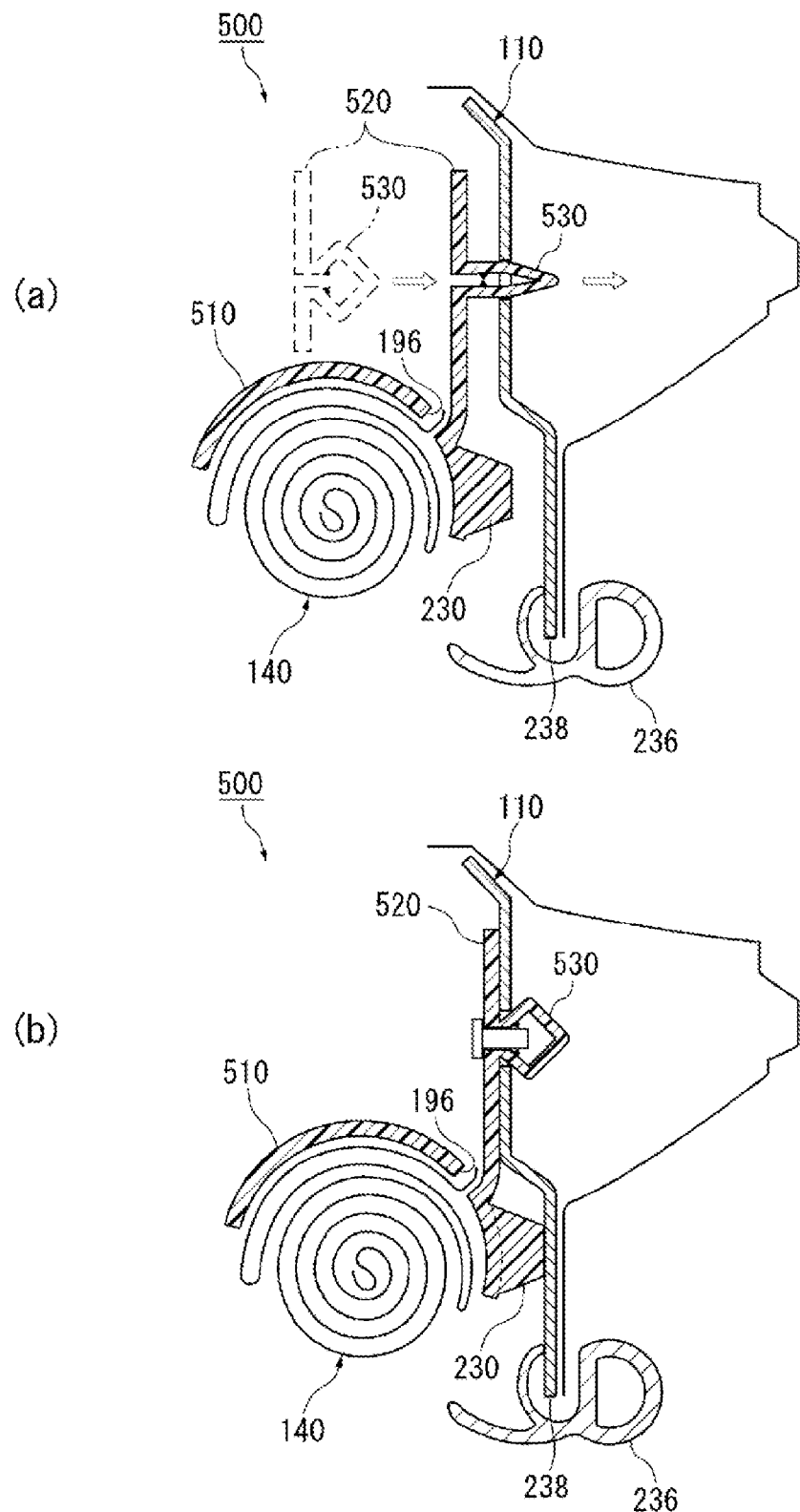
FIGS. 17(a) and 17(b) are views illustrating a fifth embodiment of the curtain airbag device according to the present invention.

FIG. 17 is a view illustrating a fifth embodiment of the curtain airbag device according to the present invention, which shows a modified version of the curtain air bag device 400 of FIG. 16 viewed in the front to back direction of the vehicle. The curtain airbag device 500 according to this embodiment illustrates a method of securing a protector tab 520 of the protector 510 on its own to the vehicle body. The protector tab 520 of the curtain airbag device 500 has a pantograph-like fixture part 530 formed integrally on the vehicle outer side thereof. As shown in FIG. 17(a), the pantograph-like fixture part 530 takes on a horizontally long diamond shape when inserted into a hole provided in the roof side rail 110, while, as illustrated in FIG. 17(b), it becomes vertically long on the opposite side of the hole so that the protector 500 can be secured. An additional pin or a screw or the like may be inserted into the pantograph-like fixture part 530 once it is vertically long to stop the pantograph-like fixture part 530 from becoming smaller than the hole again so as to make the fixing firmer.

Sixth Embodiment

Figure 18:
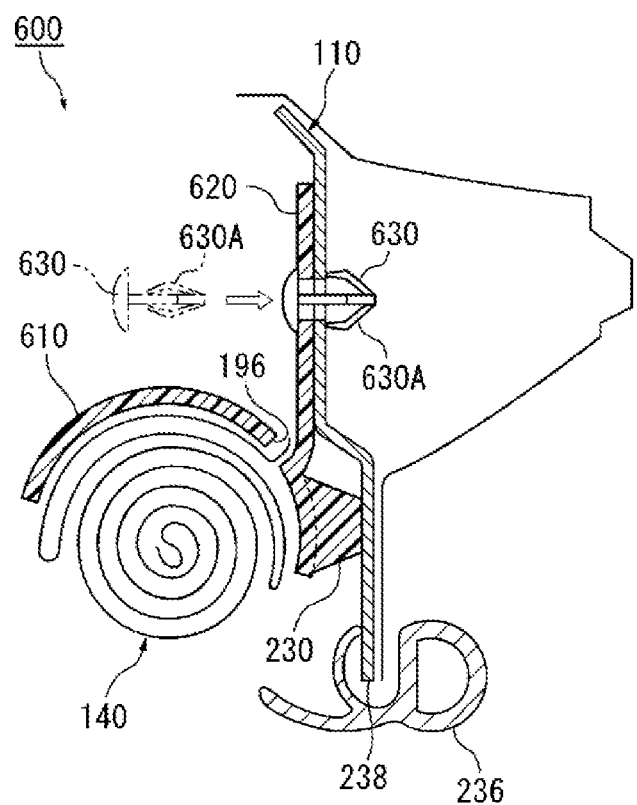
FIG. 18 is a view illustrating a sixth embodiment of the curtain airbag device according to the present invention.

FIG. 18 is a view illustrating a sixth embodiment of the curtain airbag device according to the present invention, which shows a modified version of the curtain air bag device 400 of FIG. 16 viewed in the front to back direction of the vehicle. The curtain airbag device 600 according to this embodiment illustrates a method of securing a protector tab 620 of the protector 610 on its own to the vehicle body. The protector tab 620 of the curtain airbag device 600 is secured to the vehicle body with an anchor-like fixture part 630. As shown in FIG. 18, the anchor-like fixture part 630 retracts the surrounding wings 630A so as not to get caught when inserted into a hole provided in the roof side rail 110, and lets the wings 630A come out with a resilient force on the opposite side of the hole so as not to come off of the hole, thereby completing the fixture.

Seventh Embodiment

Figure 19:
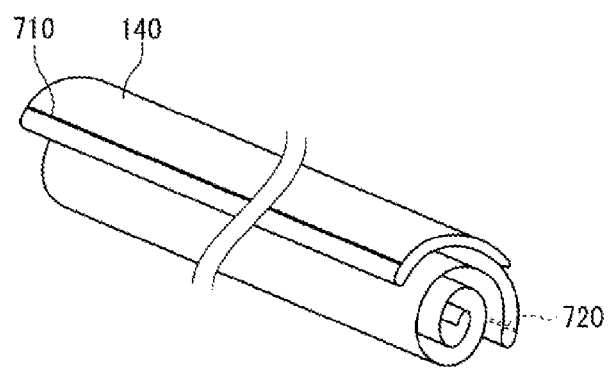
FIGS. 19(a) and 19(b) are views illustrating a seventh embodiment of the curtain airbag device according to the present invention.
Figure 19:
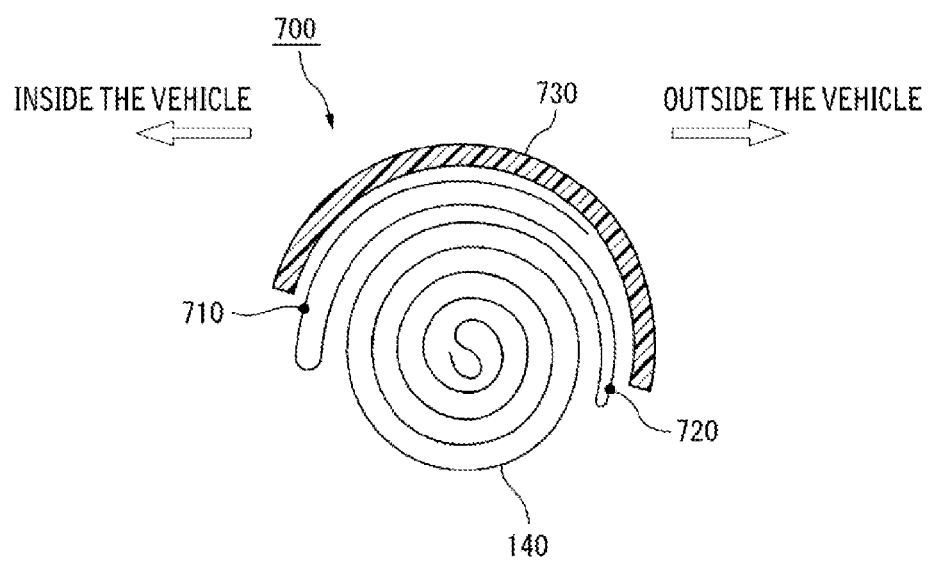

FIG. 19 is a view illustrating a seventh embodiment of the curtain airbag device according to the present invention. In the curtain airbag device 700 according to this embodiment, as illustrated in FIG. 19(a), lines 710 and 720 are drawn near two folded back portions of the rolled-up cushion part 140 for correctly positioning the protector 730 to the cushion part 140.

This embodiment is a modified version of the curtain airbag device 400 of FIG. 16. Namely, the device is of the type having the protector tabs 220 and the cushion tabs 170 offset from each other and cannot be overlapped and fastened together.

The presence of the protector tabs 220 prevents the protector from being twisted to the vehicle body. However, in some cases the protector tabs 220 and the cushion tabs 170 are offset from each other as shown in FIG. 16 and cannot be fastened together. In such a case, the cushion part 140 needs to be positioned to the protector 180 first before mounting the protector 180 to the vehicle body. If the cushion part 140 is not positioned to the protector 180, the cushion part 140 may be twisted to the vehicle body, because of which the cushion part 140 may fail to inflate and deploy in an appropriate direction even though the protector 180 is not twisted.

Figure 20:
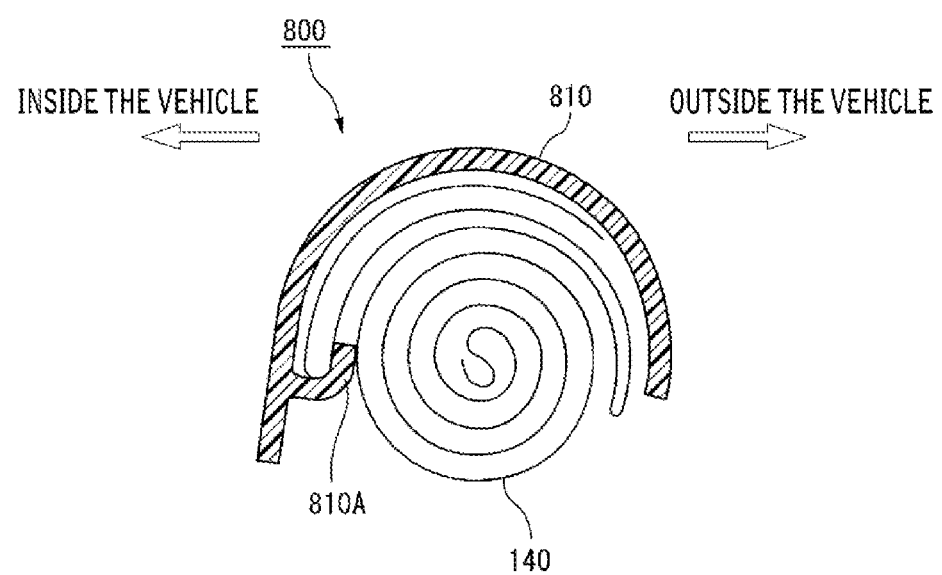
FIG. 20 is a view illustrating an eighth embodiment of the curtain airbag device according to the present invention.

FIG. 19(b) is a view showing the protector 730 used in this embodiment viewed along the front to back direction of the vehicle. FIG. 19(b) illustrates only the protector 730 and the cushion part 140 and other elements are not shown. The lines 710 and 720 for the positioning purpose may be provided near the folded-back portions of the cushion part 140 as illustrated in FIG. 20, or, they may be provided to the folded-back portions themselves. The lines 710 and 720 may be provided either way, as long as they are located at positions exposed and visible from outside when the cushion part 140 is covered by the protector 730 as shown in FIG. 19(b). Workers can correctly position the protector 730 and the cushion part 140 using these lines 710 and 720 as marks.

Eighth Embodiment

FIG. 20 is a view illustrating an eighth embodiment of the curtain airbag device according to the present invention, which shows the curtain air bag device 800 according to this embodiment viewed in the front to back direction of the vehicle. This embodiment is also a modified version of the curtain airbag device 400 of FIG. 16. Namely, the device is of the type having the protector tabs 220 and the cushion tabs 170 offset from each other and cannot be overlapped and fastened together, so that the cushion part 140 needs to be positioned relative to the protector.

As illustrated in FIG. 20, the protector 810 in this embodiment includes a hook portion 810A integrally formed on the inner face thereof. The hook portion 810A is positioned near the end point on the vehicle inner side of the protector 810, the distal end thereof facing toward the center on the inner surface of the protector 810. One folded-back portion of the cushion part 140 is accommodated in such a hook portion 810A so that workers can correctly position the protector 810 and the cushion part 140.

The hook portion 810A may be provided over the entire length of the protector 810 in the front to back direction of the vehicle, or may be provided intermittently at several locations.

Ninth Embodiment

Figure 21:
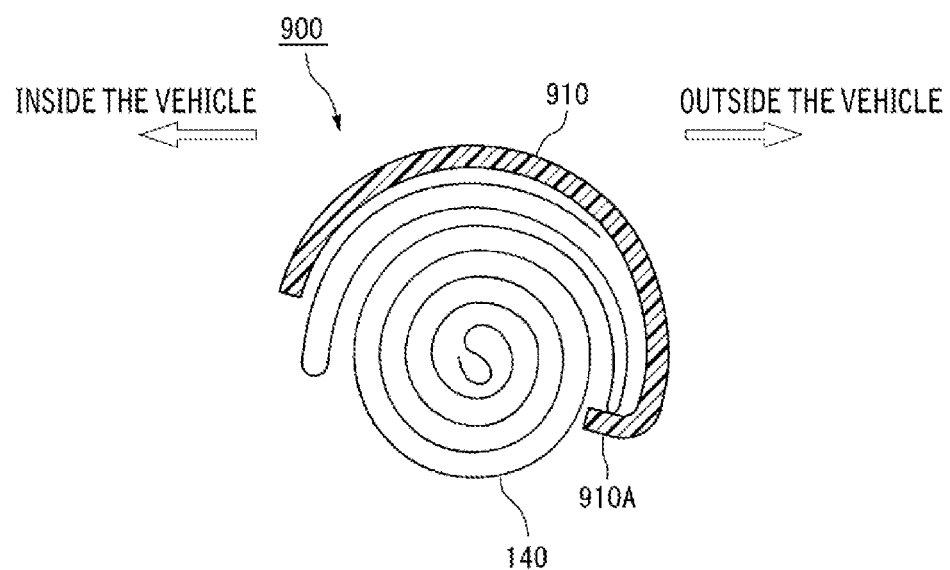
FIG. 21 is a view illustrating a ninth embodiment of the curtain airbag device according to the present invention.

FIG. 21 is a view illustrating a ninth embodiment of the curtain airbag device according to the present invention, which shows the curtain air bag device 900 according to this embodiment viewed along the front to back direction of the vehicle. This embodiment is also a modified version of the curtain airbag device 400 of FIG. 16. Namely, the device is of the type having the protector tabs 220 and the cushion tabs 170 offset from each other and cannot be overlapped and fastened together, so that the cushion part 140 needs to be positioned relative to the protector.

As illustrated in FIG. 21, the protector 910 of this embodiment has its end on the vehicle outer side bent toward inside of the vehicle and extended to form an extended portion 910A. The other folded-back portion of the cushion part 140 is accommodated in this extended portion 910A so that workers can correctly position the protector 910 and the cushion part 140.

The extended portion 910A may also be provided over the entire length of the protector 910 in the front to back direction of the vehicle, or may be provided intermittently at several locations.

While preferred embodiments of the present invention have been described with reference to the accompanying drawings, the embodiments described above are preferred examples of the present invention and other embodiments can be carried out or performed in various manners. In particular, this invention should not be limited to the detailed shapes, sizes, configurations, and arrangements etc of components illustrated in the accompanying drawings, unless stated to the contrary in the specification of the present application. The expressions and terms used herein are for illustrative purposes only and should not be interpreted as limiting unless stated to the contrary.

Accordingly, it will be understood that a person skilled in the art could obviously conceive various changes or modifications that can be made within the scope of the claims and that these too will naturally belong to the technical scope of the present invention.

While the curtain airbag according to the present invention was described in the embodiments above as applied to a car as one example, the curtain airbag can be applied to other vehicles such as aircraft or ships and provide the same effects.

The invention claimed is:

1. A curtain airbag device accommodated in an upper part of one side of a vehicle interior, comprising:
    a cushion part extending in a front to back direction of the vehicle, accommodated in a state rolled up from a lower end toward an upper end thereof, and inflating and deploying downward when gas is supplied thereto;
    an inflator for supplying the gas to the cushion part from a predetermined position at the upper end of the cushion part; and
    an elongated protector having an arc-like open curve cross section open downward and covering the cushion part, with an inner surface thereof making contact with the cushion part,
    the cross section of the protector being defined by the open curve including two end points, with one of the end points of the open curve on a vehicle inner side smoothly going up at a first end near the inflator in a flared manner so that the open curve has an increasing distance between the end points thereof.

2. The curtain airbag device according to claim 1, wherein the protector covers the cushion part between the inflator and a pillar on one side of the vehicle interior,
    the cross section of the protector being defined by the open curve, with the end point of the open curve on the vehicle inner side smoothly going up at a second end near the pillar so that the open curve has an increasing distance between end points thereof.

3. The curtain airbag device according to claim 1, wherein at the first end of the protector near the inflator the opening of the protector is visible from the inside of the vehicle.

4. A curtain airbag device accommodated in an upper part of one side of an interior of an automotive vehicle, comprising:
    a cushion part extending in a front to back direction of the vehicle, accommodated in a state rolled up from a lower end toward an upper end thereof, and inflating and deploying downward when gas is supplied thereto;
    an inflator for supplying the gas to the cushion part from a predetermined position at the upper end of the cushion part; and
    an elongated protector having an arc-like open curve cross section open downward and covering the cushion part, with an inner surface thereof making contact with the cushion part, and
    a rotation prevention portion configured to prevent rotation of the curtain airbag device during inflation of the cushion part.

5. The curtain airbag device according to claim 4, wherein the rotation prevention portion projects from an exterior surface of the protector.

6. The curtain airbag device according to claim 4, wherein the rotation prevention portion includes a position alignment feature, the position alignment feature being configured to align the protector with the cushion part.

7. The curtain airbag device according to claim 6, wherein the position alignment feature includes a slit formed in the protector and a tab formed on the cushion part, the tab being received through the slit.

8. The curtain airbag device according to claim 4, wherein the rotation prevention portion includes a protector tab, the protector tab being configured for mounting the protector to a fixed element of the vehicle.

9. The curtain airbag device according to claim 4, wherein the protector further includes a protrusion integrally extending from an exterior surface of the protector and protruding into a gap defined between the protector and a body portion of the vehicle.

10. The curtain airbag device according to claim 4, wherein the protector includes an extension portion, the extension portion integrally extending from the protector toward a ceiling portion of the interior of the vehicle.

11. The curtain airbag device according to claim 4, wherein the cushion part includes a line defined on the cushion part, the line being aligned with a portion of the protector whereby the protector is positioned relative to the cushion part.

12. The curtain airbag device according to claim 4, wherein the protector includes a hook portion, the hook portion receiving a portion of the cushion part therein whereby the protector is positioned relative to the cushion part.

13. The curtain airbag device according to claim 12, wherein the hook portion extends from an interior surface of the protector.

14. The curtain airbag device according to claim 12, wherein the hook portion receives a folded-back portion of the cushion part therein.

15. The curtain airbag device according to claim 12, wherein the hook portion is provided over substantially an entire length of the protector.

16. The curtain airbag device according to claim 4, wherein the protector includes an extended portion, the extended portion extending inwardly of the protector and engaging a portion of the cushion part whereby the protector is positioned relative to the cushion part.

17. The curtain airbag device according to claim 16, wherein the extended portion engages a folded-back portion of the cushion part.

\* \* \* \* \*